Patented Jan. 27, 1931

1,790,066

UNITED STATES PATENT OFFICE

FRITZ MIETZSCH AND HEINRICH KLÖS, OF ELBERFELD, GERMANY, ASSIGNORS TO WINTHROP CHEMICAL COMPANY, INC., OF NEW YORK, N. Y., A CORPORATION OF NEW YORK

6.8-DIHYDROXYQUINOLINE ETHER

No Drawing. Application filed September 7, 1927, Serial No. 218,108, and in Germany September 18, 1926.

The present invention relates to new 6.8-dihydroxy-quinoline-ethers. More particularly it relates to the compounds of the general formula:

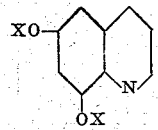

wherein at least one X represents an alkyl group which may be substituted by a substituent of the group comprising aryl, hydroxyl, and amino, and the other X represents hydrogen or an alkyl group which may be substituted by a substituent of the group comprising aryl, hydroxyl, and amino.

Our new compounds are obtainable, for instance, by alkylating in the known manner 6.8-dihydroxy-quinoline. When the reaction is effected with an excess of alkylating agent, diethers are chiefly obtained together with a little mono-ether. There is also a difference of reactivity of the two hydroxyl groups, since of the two possible mono-ethers the 6-derivative is always produced preponderatingly. The separation of the mono-ethers from the diethers is carried out, for example, by the taking advantage of their solubility in alkali.

Our new products possess a very active therapeutic character. They are substances of a low melting point, being difficultly soluble in water, easily soluble in ether, benzene, and alcohol, and forming with hydrochloric acid yellow salts which are easily soluble in water.

The 6-mono-ethers similarly to the 6.8-dihydroxy-quinoline itself produce deep green colorations with ferric chloride solution and with solutions of copper salts yellow to brown precipitates of difficultly soluble copper compounds. Conversely the diethers and 8-mono-ethers do not perceptibly react with ferric chloride and do not produce precipitates with copper salts.

Our new products are furthermore obtainable by subjecting a mono or dialkyl-ether of 4-amino-1.3-resorcinol to the well-known Skraup synthesis.

The following examples will illustrate our invention, which is applicable within wide limits:

Example 1

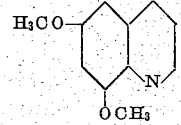

A solution of one molecule of 6.8-dihydroxy-quinoline in absolute alcohol is treated with two molecules of sodium ethylate, two molecules of p-toluene-sulfonic acid-methyl-ester are added and the whole is stirred for several hours at 40–50° C. on the water-bath. In order to complete the alkylation as far as possible one molecule each of sodium ethylate and toluene sulfonic acid-methyl-ester are repeatedly added and the treatment is continued at the above temperature. The alcohol is then distilled off, the residue is treated with aqueous caustic lye and extracted with ether, whereby 6.8-dimethoxy-quinoline is obtained in the ethereal extract. It distils under about 1 mm. pressure at 132–134° C. as a light yellow oil, which is viscous in the cold and solidifies to crystals melting at 56° C. The aqueous caustic soda layer after exact neutralization with acetic acid and extraction with ether yields the 6-methoxy-8-hydroxy-quinoline, which can be obtained from dilute alcohol ether and the like in large colorless crystals, melting at 125° C. It is a valuable antipyretic.

The same 6.8-dimethoxy-quinoline is produced from 6-methoxy-8-hydroxy-quinoline (which is obtainable for example by means of the Skraup reaction from 2-hydroxy-4-methoxy-1-aminobenzene) by further alkylation in absolute alcoholic solution with sodium ethylate and dimethyl sulfate at 40–50° C.

The new product behaves analogously to antifebrin, it acts as an antiepilepsin and likewise exerts a beneficial intestinal action.

Example 2

6.8-dimethoxy-quinoline is also obtained by subjecting 2.4-dimethoxy-1-aminobenzene described by Bechhold, Ber. 22, (1889), page 2378 to the Skraup reaction. In order to effect this reaction 200 grams of 2.4-dimethoxy-1-aminobenzene, 200 grams of arsenic acid and 600 grams of glycerine are heated to about 75° C., 100 cc. of sulfuric acid of 66° Bé. are added and the whole heated for two hours to 145° C., after which a further 100 cc. of sulfuric acid added and the heating is continued at 145° C. for a further two hours. The reaction mixture is then diluted with water, boiled several times with animal charcoal, rendered alkaline, extracted with ether and distilled.

*Example 3*

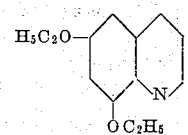

6.8-dihydroxy-quinoline is treated as described in Example 1 in absolute alcohol with sodium ethylate and toluene-sulfonic acid-ethyl-ester. 6.8-diethoxy-quinoline is thus obtained, distilling under about 2 mm. pressure at 153° C. and melting at 60° C. and also some 6-ethoxy-8-hydroxy-quinoline, which melts at 125° C.

The new product is intended for use as an intestinal remedy.

*Example 4*

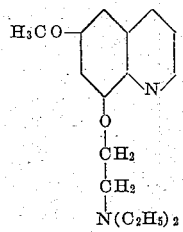

6 - methoxy - 8 - hydroxy - quinoline is dissolved in absolute alcohol, to which solution the calculated quantity of sodium ethylate and subsequently diethyl-amino-ethyl chloride are added in slight excess, after which the whole is stirred for several hours at about 50° C. After distillation of the alcohol the residue is extracted by boiling with ether, the ethereal extract is extracted several times with caustic soda and finally distilled. The 6-methoxy-8-diethyl-amino-ethoxy-quinoline boils as a light violet oil (which becomes discolored) at 193° C. under 4 mm. pressure and forms a light yellow hygroscopic hydrochloride.

We claim:

1. As a new product 6.8-diethoxy-quinoline having most probably the formula:

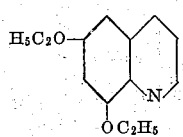

distilling under about 2 mm. pressure at 153° C. and melting at 60° C. and being a beneficial intestinal remedy.

2. As new products the compounds of the general formula:

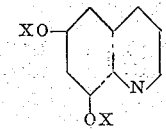

wherein at least one X represents an alkyl group, a hydrogen of which may be substituted by a substituent of the group comprising aryl, hydroxyl, and amino, and the other X represents hydrogen or an alkyl group, a hydrogen of which may be substituted by a substituent of the group comprising aryl, hydoxyl, and amino, said compounds possessing a very active therapeutical action.

3. As new products the compounds of the general formula:

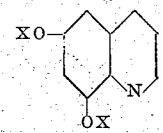

wherein at least one X represents a radical of the group comprising methyl and ethyl, and the other X represents hydrogen or a radical of the group comprising methyl and ethyl, said compounds possessing a very active therapeutical action.

In testimony whereof we have hereunto set our hands.

FRITZ MIETZSCH.
HEINRICH KLÖS.